United States Patent

[11] 3,585,520

[72] Inventors Hisayoshi Yanai
Tokyo;
Masatoshi Migitaka, Kodaira-shi; Hiroshi Kodera, Hino-shi; Toshiaki Ikoma, Kokubunji-shi; Takayuki Sugeta, Tokyo, all of, Japan

[21] Appl. No. 759,131
[22] Filed Sept. 11, 1968
[45] Patented June 15, 1971
[73] Assignee Hitachi, Ltd.
Tokyo, Japan
[32] Priority Sept. 13, 1967
[33] Japan
[31] 42/58397

[54] DEVICE FOR GENERATING PULSED LIGHT BY STIMULATED EMISSION IN A SEMICONDUCTOR TRIGGERED BY THE FORMATION AND TRANSIT OF A HIGH FIELD DOMAIN
8 Claims, 4 Drawing Figs.

[52] U.S. Cl. .......... 331/94.5, 307/312, 332/7.51, 331/94.5, 350/160

[51] Int. Cl. .......... H01s 3/10
[50] Field of Search .......... 331/94.5; 307/312; 332/7.51; 350/160

[56] References Cited
UNITED STATES PATENTS

| | | | |
|---|---|---|---|
| 3,245,002 | 4/1966 | Hall | 331/94.5 |
| 3,344,365 | 9/1967 | Lewis | 331/94.5 |

*Primary Examiner*—William L. Sikes
*Attorney*—Craig & Antonelli

ABSTRACT: A device for generating pulsed light comprising a semiconductor element including a PN junction therein capable of inducing Gunn oscillation and radiating laser light, a negative electrode attached to a portion of the N-type region of the semiconductor element, and a positive electrode attached to a portion of the P-type region of the semiconductor element.

INVENTORS
HISAYOSHI YANAI
MASATOSHI MIGITAKA
HIROSHI KODERA
TOSHIAKI IKOMA
TAKAYUKI SUGETA
BY Craig & Antonelli
ATTORNEYS

DEVICE FOR GENERATING PULSED LIGHT BY STIMULATED EMISSION IN A SEMICONDUCTOR TRIGGERED BY THE FORMATION AND TRANSIT OF A HIGH FIELD DOMAIN

BACKGROUND OF THE INVENTION

1. Field of the Invention

The present invention relates to devices for generating pulsed light, and more particularly to a novel device for generating pulsed light employing a semiconductor element having a bulk negative resistance effect and a PN junction provided in the semiconductor element for generating laser light.

2. Description of the Prior Art

Pulsing such light as laser light has been proposed for the purpose of applying such pulses to telecommunications by the method of pulse code modulation, logic circuits in electronic computers, etc. As a method of pulsing light a method of feeding a pulsed electric current to a device which emits light by the application of electric current such as a Xenon lamp, a laser diode, etc. is known. However, the rise and fall of the pulsed light obtained by this method are very gentle. It seems that this is because the rise and fall times of the pulsed light depend on the rise and fall characteristics of the light emitting device and the rise and fall times of the pulsed electric current fed to the light emitting device. Ordinary laser diodes have very short rise and fall times against pulse signals, and hence are most suitable for light emitting devices for obtaining steep pulses. However, by an devices for supplying pulsed currents to laser diodes it is generally difficult to generate pulses having steep rise and fall except in the case of considerably expensive ones manufactured with a high degree of technical skill. Moreover, even with the highest conventional technical skill a satisfactory device for generating pulses of high rate corresponding to the response time of the laser diode has not yet been fabricated. Consequently, the conventional device cannot provide pulsed light having steep rise and fall, and hence according to the conventional device large number of pulses cannot be included in a definite frequency band, resulting in incapability of increasing the amount of information. Even when a pulsed current supplying device fabricated with a high degree of technical skill is employed in order to obviate the above-mentioned disadvantages, the device becomes complicated and bulky, and hence apparatuses such as computers, communications equipments employing the pulse code modulation method, etc. become bulky and expensive.

SUMMARY OF THE INVENTION

Therefore, an object of the present invention is to provide a pulsed light generating device of simple structure capable of supplying pulsed light with a steep rise and fall.

Another object of the present invention is to provide a pulsed light generating device capable of optionally controlling the pulse width of pulsed light.

In the present invention, laser light emitted by a PN junction provided in a semiconductor element having a bulk negative resistance effect is pulsed by a high field domain developed in the semiconductor element.

DESCRIPTION OF THE PREFERRED EMBODIMENTS

Figure 1:
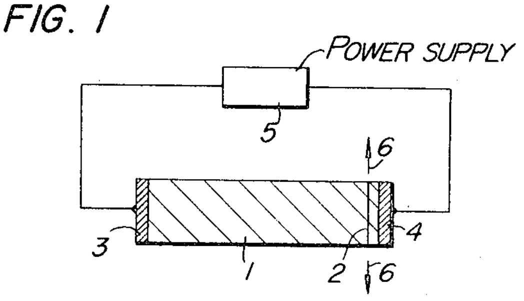
FIG. 1 is an elevational cross section of a semiconductor element for explaining the principle of the invention.

For a better understanding of the invention the following description will be made with reference to a Gunn oscillation element as a semiconductor element having a bulk negative resistance effect.

As is well known, the Gunn oscillation is a current oscillation at microwave frequencies (several to several 10 GHz.) induced when an electric field higher than a certain threshold value (approximately several thousand volts/cm.) is applied to a single crystal semiconductor body such as N-type GaAs, InP, etc. having a resistivity of several to several hundred ohm-cm. through electrodes provided to the semiconductor body with ohmic contact. The mechanism of the Gunn oscillation is believed to be as follows: A high field domain is established at a portion of high electric field (commonly in the vicinity of the negative electrode) in the single crystal semiconductor body due to the fact that some of the charge carriers in the semiconductor body make a transition from an energy band of a smaller effective mass to an energy band of a larger effective mass in an electric field larger than the threshold electric field. The high field domain runs with a velocity approximately equal to the drift velocity of carriers towards the positive electrode and disappears at the electrode. Then a high field domain is again developed and repeats the running between the electrodes. The current caused by the application of the electric field is decreased by the development of the high field domain and restored its initial value by the arrival at the positive electrode and the disappearance of the high field domain. By the repetition of this process the Gunn oscillation results.

As is well known, although the said high field domain develops only at electric fields higher than a certain threshold field, the high field domain once developed does not become extinct until the electric field applied to the single crystal semiconductor body becomes less than about 70 percent of the threshold value. One feature of the present invention is to utilize this fact, which will be described in detail later.

When a forward electric current equal to or larger than a certain threshold current (current density: of the order of 1000 A./cm.$^2$) is fed to a PN junction provided in a single crystal semiconductor body of the direct transition type such as GaAs, InP, etc. and included in an optical resonator which is formed by making a pair of side surfaces of the single crystal semiconductor body parallel with each other, smooth, and perpendicular to the PN junction, light rays having a wavelength of, for example, 8000 to 9000 A. for GaAs are emitted in a direction perpendicular to the smooth side surface. This is known as a semiconductor laser.

In the present invention, a PN junction for laser emission is formed in a Gunn oscillation element, and a current in the Gunn oscillation element in a state wherein the high field domain is not developed is selected to be higher than the threshold current for laser emission. The light emitted by the PN junction is pulsed by the production and annihilation of the high field domain.

Now, the invention will be described with reference to the drawings. As shown in FIG. 1, when a Gunn oscillation element 1 provided with a PN junction 2 capable of emitting laser light, and negative and positive electrodes 3 and 4, respectively, so that a current flows through the junction 2 in a forward direction is supplied by a power source 5 with a power capable of inducing a Gunn oscillation and sufficient for allowing the PN junction 2 to emit laser light, a high field domain develops in the vicinity of the negative electrode 3 of the Gunn oscillation element 1, which runs to the positive electrode 4 approximately at the same velocity as the drift velocity of charge carriers to become extinct at the positive electrode 4, and repeats this process as stated before. On the other hand, a forward current flowing through the PN junction 2 is very small during the presence of the high field domain in the Gunn oscillation element 1, while it is large when the high field domain becomes extinct. Consequently, if a power from the power source 5 is maintained at a value capable of causing a Gunn oscillation and sufficient for permitting the laser diode to emit light as stated above, light rays 6 are emitted by the PN junction 2 when the high field domain disappears and are not emitted during the presence of the high field domain. Thus, the light 6 from the PN junction becomes pulsed light having the same frequency as the oscillation frequency of the Gunn oscillation element, the rise and fall times of which are approximately equal to the extinction and generation times, i.e. of the order of about $200\times10^{12}$ sec. (200 pico sec.) or less. Thus, the rise and fall times are very short.

Figure 2:
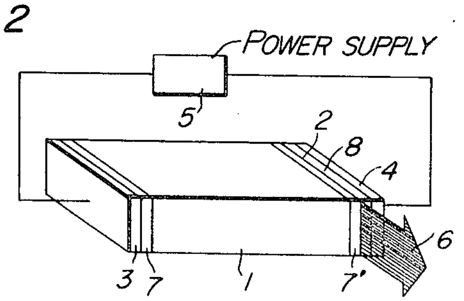
FIG. 2 is a perspective view of an embodiment of the invention.

In FIG. 2, reference numeral 1 designates an N-type GaAs body having a resistivity of 3 ohm-cm. and in the form of a rectangular parallelepiped of about 200 microns in length, 100 microns in width and 50 microns in thickness, 7 and 7′ designate $N^+$-type GaAs layers grown on and in longitudinal directions of the GaAs body, 8 designates a $P^+$-type GaAs layer grown on one 7′ of the $N^+$-type GaAs layers, 2 designates a PN junction formed between the $N^+$- and $P^+$-type GaAs layers, and 3 and 4 designate metal electrodes forming ohmic contact to the $N^+$-type GaAs layer 7 and the $P^+$-type GaAs layer 8, respectively. Needless to say, opposite side surfaces of the $N^+$- and $P^+$-type GaAs layers at which the PN junction 2 terminates are parallel with each other, smooth and perpendicular to the PN junction 2.

Such a device for generating pulsed light can easily be fabricated by employing the conventional techniques of fabricating semiconductor devices, for example the liquid phase growth technique, the polishing technique, etc. For example, the pulsed light generating device of FIG. 2 is fabricated as follows: Single crystal GaAs layers doped with Sn are grown by a liquid phase growth technique to 10 microns on and in lateral directions of an N-type single crystal GaAs body having a resistivity of 3 ohm-cm. and a dimension of 200 microns in width, 100 microns in thickness and several millimeters in length. Then, a single crystal GaAs layer doped with Zn is grown by the liquid phase growth technique to 10 microns on one of the GaAs grown layers doped with Sn, i.e. $N^+$-type GaAs layers to form a PN junction therebetween. The thus obtained element is lapped on both surfaces thereof to a thickness of 50 microns. The element is then cut in a direction perpendicular to its length into pieces each having a length of 100 microns by utilizing the cleavage of the GaAs single crystal. Finally, Ni is evaporated onto the GaAs layer doped with Sn and the GaAs layer doped with Zn to form electrodes. Thus, a pulsed light generating device having a dimension of about 200 microns × 100 microns × 50 microns as shown in FIG. 2 is obtained.

When a power source 5 of 60 volts is connected to this pulsed light generating device so that the electrode 3 becomes of positive polarity and the electrode 4 becomes of negative polarity at a temperature of 70° K., the PN junction 2 emits pulsed light having a repetition rate of 500 MHz. and a pulse width of $300\times10^{12}$ sec. (300 pico sec.). The rise and fall times of the pulsed light are very short. According to experiments made by the inventors the rise and fall times were approximately of the order of $100\times10^{12}$ sec. (100 pico sec.).

Although only the case where laser light is pulsed at the same frequency as that of a Gunn oscillation element has been stated in the above description, the present invention can also provide a more practical pulsed light generating device capable of controlling pulse intervals of pulsed light. This can be done by utilizing the fact that the aforementioned high field domain develops at electric fields higher than a certain threshold field and does not disappear until the field becomes approximately 70 percent of the threshold field (hereinafter referred to as high field domain sustaining field) or less.

Figure 3:
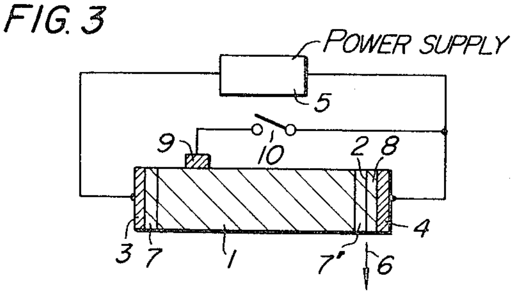
FIG. 3 is an elevational cross section of another embodiment of the invention.

An embodiment utilizing this fact is shown in FIG. 3. The parts designated by reference numerals 1 to 8 in FIG. 3 correspond to similar parts of the embodiment of FIG. 2. The power of the power supply 5 is selected such that the electric field developed between the electrodes 3 and 4 is lower than the threshold field and higher than the high field domain sustaining field, and yet a current sufficient to cause the PN junction to emit laser light is supplied, and an electric field higher than the threshold field is developed between the negative electrode 3 and a third electrode 9 by closing a switch 10. The field developed between the third electrode 9 and the negative electrode 3 can be controlled by controlling the distance between them.

In the open state of the switch 10, since only a field lower than the threshold field is being applied to the Gunn oscillation element 1, the high field domain does not develop in the element 1, and hence a large current is flowing through the PN junction 2 in the forward direction so that the PN junction 2 continues to emit laser light. Hereupon, if the switch 10 is closed for a moment, the high field domain develops in the element 1 because almost the entire power of the power supply 5 is applied across the third electrode 9 and the negative electrode 3 for a moment, and hence a current barely flows through the PN junction 2 so that the emission of laser light is interrupted. The time interval during which the emission of laser light is interrupted is the time interval during which the high field domain exists in the Gunn oscillation element 1, i.e. from the instant of the development of the high field domain due to the closure of the switch 10 to the instant of the disappearance of the high field domain due to its arrival at the electrode 4. Thus, laser light can be pulsed by making and breaking the switch 10.

This kind of pulsed light generating device can be obtained by providing the third electrode 9 and the switch 10 to, for example, the device of FIG. 2. The third electrode 9 is provided at a distance of 50 microns from the negative electrode 3. Therefore, this pulsed light generating device is about 200 microns in length, 100 microns in width, and 50 microns in thickness, and provided with the electrodes 3 and 4 at its ends in a longitudinal direction and with the third electrode 9 at a distance of 50 microns from the negative electrode 3.

If such a pulsed light generating device is connected with a power supply 5 of 60 volts so that the electrode 3 becomes of negative polarity and the electrode 4 becomes of positive polarity at a temperature of 70° K., it emits laser light from the PN junction. Hereupon, if the switch 10 is closed for $10^{110}$ sec., the emission of laser light is interrupted for $2\times10^{19}$ sec. (2 nano sec.). At this time the rise and fall times of the pulsed light are very short. According to the experiments made by the inventors they were of the order of $200\times10^{12}$ sec. (200 pico sec.).

In the above-mentioned embodiment of FIG. 3, the laser light emitted from the PN junction 2 by supplying the device 1 from the power supply 5 with such a power as capable of developing an electric field lower than the threshold field but higher than the high field domain sustaining field between the electrodes 3 and 4, supplying a current sufficient for causing the PN junction 2 to emit laser light, and developing an electric field higher than the threshold value between the negative electrode 3 and the third electrode 9 was temporarily interrupted by closing the switch 10 for a moment. However, the laser light can also be temporarily interrupted by supplying the device 1 from the power supply 5 connected between the electrodes 3 and 4 with such a power as capable of developing an electric field lower than the threshold field between the negative electrode 3 and the positive electrode 4 and supplying a current sufficient for causing the PN junction 2 to emit laser light and by interrupting for a moment the application of another power from another power supply connected between the negative electrode 3 and the third electrode 9 through another switch to the device 1 by closing the said another switch for a moment, the said another power being capable of developing an electric field higher than the threshold field when overlaps the power from the power supply 5.

Hereinabove, the case where laser light is pulsed by interrupting the emission of the laser light has been described. An embodiment in which laser light is pulsed by intensity-modulating the laser light will next be described with reference to FIG. 4.

Figure 4:
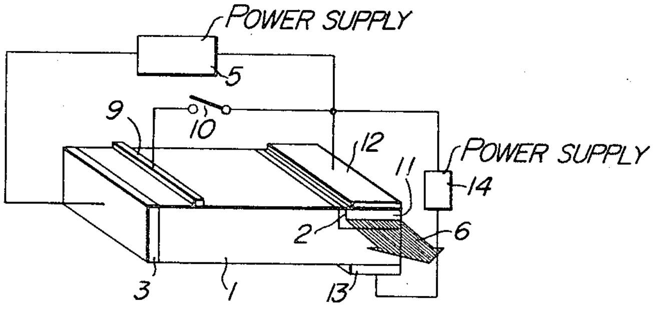
FIG. 4 is a perspective view of still another embodiment of the invention.

As shown in FIG. 4 the Gunn oscillation element 1 is provided therein with the PN junction 2 in a longitudinal direction with a layer 11 being of positive conductivity type. The P-type layer 11 is provided with a positive electrode 12 and the opposite surface of the element 1 is provided with a fourth electrode 13 at a position corresponding to the positive electrode 12. As in the embodiment of FIG. 3 the element 1 is also provided with the negative electrode 3 and the third electrode 9. The positive electrode 12 and the negative electrode 3 are connected through the first power supply 5 feeding such a power as capable of developing between the electrodes 3 and 12 an electric field lower than the threshold field but higher than the high field domain sustaining field, supplying a current sufficient for causing the PN junction to emit laser light, and developing between the negative electrode 3 and the third electrode 9 an electric field higher than the threshold field, the positive electrode 12 and the fourth electrode 13 are connected through a second power supply 14 capable of supplying a current equal to or higher than the threshold current of the PN junction, and the positive electrode 12 and the third electrode 9 are connected through the switch 10.

In the open state of the switch 10, a forward current form the first power supply 5 and the second power supply 14 flows through the PN junction because of the nonexistence of the high field domain in the Gunn oscillation element 1, and thereby very strong laser light 6 is emitted. Hereupon, if the switch 10 is closed for an instant, the high field domain develops at that moment in the vicinity of the negative electrode 3, and hence the potential of the first power supply 5 is entirely applied to the high field domain. Thus, the current flowing through the PN junction is only that supplied by the second power supply 14. Consequently, the intensity of laser light emitted by the PN junction in this case is very faint compared with that emitted in the open state of the switch 10. The time interval during which the laser light is faint is the time during which the high field domain is present in the Gunn oscillation element 1. Thus, laser light is pulsed based on the intensity modulation by opening and closing the switch 10.

When the voltage of the first power supply 5 was 70 volts, and the voltage of the second power supply 14 was 4 volts, intense laser light 6 was emitted from the PN junction 2 in the open state of the switch 10. However, when the switch 10 was closed for an instant, weak laser light was emitted from the PN junction for $2\times10^{19}$ sec. (2 nano sec.). The rise and fall times of the pulsed light were very short, that is, less than approximately $100\times10^{12}$ sec. (100 pico sec.). The ratio of the intensity of the weak laser light when the high field domain was running in the N-type GaAs bulk and the intensity of the intense laser light was 0.2.

The element of FIG. 4 can easily be fabricated by employing the conventional techniques for fabricating semiconductor devices such as a selective diffusion technique, selective evaporation technique, etc. First, an $N^+$-type layer 20 microns thick including Sn is formed by a selective liquid phase growth technique in the vicinity of one end of one surface of an N-type GaAs body 300 microns long, 100 microns wide, and 50 microns thick having a resistivity of 3 ohm-cm. A heat treatment at 600° C. for 10 minutes is necessary to form the said layer including Sn to a thickness of 20 microns. Next, the $P^+$-type diffused layer 11 with a depth of 15 microns is formed by diffusing Zn into the said $N^+$-type layer at 850° C. for 5 hours to form the PN junction 2. Then, the negative electrode 3 consisting of Sn and Ni, the third electrode 9 approximately 30 microns wide consisting of Al, the positive electrode 12, and the fourth electrode 13 consisting of Sn and Ni, are formed on the end surface of the N-type GaAs body 1 opposite to the end at which the PN junction is formed, at a distance approximately 50 microns from the negative electrode 3, on the $P^+$-type diffused layer, and at a portion corresponding to the positive electrode 12 on the surface opposite to the surface on which the positive electrode 12 is formed, respectively, by selective evaporation, thereby to obtain the desired pulsed light generating device.

Although the description of the present invention has been made hereinabove with reference to a Gunn oscillation element capable of generating a high field domain by a transition of excited carriers between energy bands by way of explanation, the present invention is not restricted to such a Gunn oscillation element. Other semiconductor elements having a bulk negative resistance effect due, for example, to the interaction of carriers and phonons can also be employed. Needless to say, as the switch 10 employed in the above-described embodiments an electrically operable relay can be employed as well.

As has been described in detail, the pulsed light generating device of the invention comprises a semiconductor element having a bulk negative resistance effect and a PN junction provided therein for emitting laser light and characterized in that laser light emitted from the PN junction is pulsed by a high field domain generated and annihilated in the semiconductor element. Consequently, the rise and fall times of the pulsed light are very short, and moreover the pulse width of the pulsed light can be controlled by the time of presence of the high field domain in the semiconductor element. Therefore, if the present invention is applied to telecommunications by the method of pulse code modulation, logic circuits in electronic computers, etc., a large number of pulses can be included in a definite frequency band, and hence the amount of information can be increased.

We claim:

1. A device for generating pulsed light comprising:
a semiconductor element having therein a PN junction for laser emission, a pair of opposite surfaces of said semiconductor element being parallel to each other, smooth, and perpendicular to said PN junction, said semiconductor element having bulk negative resistance effect;
a positive electrode provided at a P-type region of said semiconductor element;
a negative electrode provided at an N-type region of said semiconductor element;
a power supply connected between said positive electrode and said negative electrode and capable of supplying said PN junction with an electric current sufficient for causing said PN junction to emit laser light; and
means for intermittently generating a high field domain in the portion of said semiconductor element between said positive electrode and said negative electrode, the emission of laser light being interrupted during the presence of said high field domain.

2. A device for generating pulsed light comprising:
a semiconductor element having therein a PN junction for laser emission, a pair of opposite surfaces of said semiconductor element being parallel to each other, smooth, and perpendicular to said PN junction, said semiconductor element having a bulk negative resistance effect;
a positive electrode provided at a P-type region of said semiconductor element;
a negative electrode provided at an N-type region of said semiconductor element; and
a power supply connected between said positive electrode and said negative electrode and capable of supplying said PN junction with an electric current sufficient to cause said PN junction to emit laser light and supplying said semiconductor element with an electric field sufficient to generate a high field domain therein.

3. A device for generating pulsed light comprising:
a semiconductor element having therein a PN junction for laser emission a pair of opposite surfaces of said semiconductor element being parallel to each other, smooth, and perpendicular to said PN junction, said semiconductor element having bulk negative resistance effect;
a positive electrode provided at a P-type region of said semiconductor element;
a negative electrode provided at an N-type region of said semiconductor element;
a third electrode provided at said N-type region of said semiconductor element;
a first power supply connected between said positive electrode and said negative electrode and capable of supplying said PN junction with an electric current sufficient to allow said PN junction to emit laser light, and a second power supply connected between said negative electrode and said third electrode and capable of supplying said semiconductor element with an electric field sufficient to generate a high field domain therein.

4. A device for generating pulsed light according to claim 3, wherein said first power supply is further capable of supplying said semiconductor element with an electric field sufficient to maintain said high field domain in said semiconductor element.

5. A device for generating pulsed light comprising:

a semiconductor element having therein a PN junction for laser emission, a pair of opposite surfaces of said semiconductor element being parallel to each other, smooth, and perpendicular to said PN junction, said semiconductor element having bulk negative resistance effect;

a positive electrode provided at a P-type region of said semiconductor element;

a negative electrode provided at an N-type region of said semiconductor element;

a third electrode provided at said N-type region of said semiconductor element;

a power supply connected between said positive electrode and said negative electrode and capable of supplying said PN junction with an electric current sufficient to cause said PN junction to emit laser light, supplying the portion of said semiconductor element between said negative electrode and said third electrode with an electric field sufficient to generate a high field domain therein, and supplying said semiconductor element with an electric field sufficient to maintain said high field domain therein; and switching means connected between said negative electrode and said third electrode.

6. A device for generating pulsed light comprising:

a semiconductor element having therein a PN junction for laser emission, a pair of opposite surfaces of said semiconductor element being parallel to each other, smooth, and perpendicular to said PN junction, said semiconductor element having bulk negative resistance effect;

a positive electrode provided at a P-type region of said semiconductor element;

a negative electrode provided at an N-type region of said semiconductor element;

a third electrode provided at said N-type region of said semiconductor element;

a fourth electrode provided at said N-type region of said semiconductor element and in the vicinity of said positive electrode;

a first power supply connected between said positive electrode and said negative electrode and capable of supplying the portion of said semiconductor element between said negative electrode and said third electrode with an electric field sufficient to generate a high field domain therein, and supplying said semiconductor element with an electric field sufficient to maintain said high field domain therein;

a second power supply connected between said positive electrode and said fourth electrode and capable of supplying said PN junction with an electric current sufficient to cause said PN junction to emit laser light; and switching means connected between said negative electrode and said third electrode.

7. A device for generating pulsed light according to claim 1, wherein said means for intermittently generating a high field domain is a means for inducing Gunn oscillation in said portion of said semiconductor element between said positive and said negative electrodes, whereby the emission of laser light will be interrupted during the presence of said high field domain generated during said Gunn oscillation.

8. A device for generating pulsed light according to claim 7, wherein said Gunn oscillation inducing means comprises a power supply connected between said positive electrode and said negative electrode.